(12) United States Patent
Griffin et al.

(10) Patent No.: US 8,531,417 B2
(45) Date of Patent: Sep. 10, 2013

(54) LOCATION OF A TOUCH-SENSITIVE CONTROL METHOD AND APPARATUS

(75) Inventors: Jason Tyler Griffin, Kitchener (CA); Todd Andrew Wood, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 433 days.

(21) Appl. No.: 12/874,714

(22) Filed: Sep. 2, 2010

(65) Prior Publication Data

US 2012/0056817 A1    Mar. 8, 2012

(51) Int. Cl.
*G06F 3/041*    (2006.01)
*G09G 3/22*    (2006.01)

(52) U.S. Cl.
USPC .......................................... 345/173; 345/183

(58) Field of Classification Search
USPC ................................................. 345/173, 178
See application file for complete search history.

(56) References Cited

U.S. PATENT DOCUMENTS

| | | |
|---|---|---|
| 6,331,840 B1 | 12/2001 | Nielson et al. |
| 7,406,666 B2 | 7/2008 | Davis et al. |
| 2006/0224986 A1 | 10/2006 | Lindsay |
| 2009/0160805 A1* | 6/2009 | Hosokawa et al. ........... 345/173 |

FOREIGN PATENT DOCUMENTS

| | | |
|---|---|---|
| EP | 1775925 A2 | 4/2007 |
| EP | 1847917 A2 | 10/2007 |
| EP | 1950651 A1 | 7/2008 |
| WO | 2005096128 A2 | 10/2005 |
| WO | 2009157687 A2 | 12/2009 |

OTHER PUBLICATIONS

EP Extended Search Report for EP Application No. 10175144.4, dated Jul. 13, 2011, 9 pages.
European Office Action, EP Application No. 10175144.4, dated Jul. 10, 2012, 4 pages.

* cited by examiner

*Primary Examiner* — Michael Faragalla (57) ABSTRACT

A method includes detecting a touch on a touch-sensitive display at a location not associated with a control, displaying, in association with the location, a displayed control, and activating the displayed control.

33 Claims, 6 Drawing Sheets

LOCATION OF A TOUCH-SENSITIVE CONTROL METHOD AND APPARATUS

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

The following describes an apparatus for and method of locating a control on a touch-sensitive display. A control, comprising a single control such as a navigation control or a control panel such as a navigation panel, is located by touch input. The location of the control may be moved. The control may be selected from a plurality of controls and/or control panels. Controls may be added or deleted.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
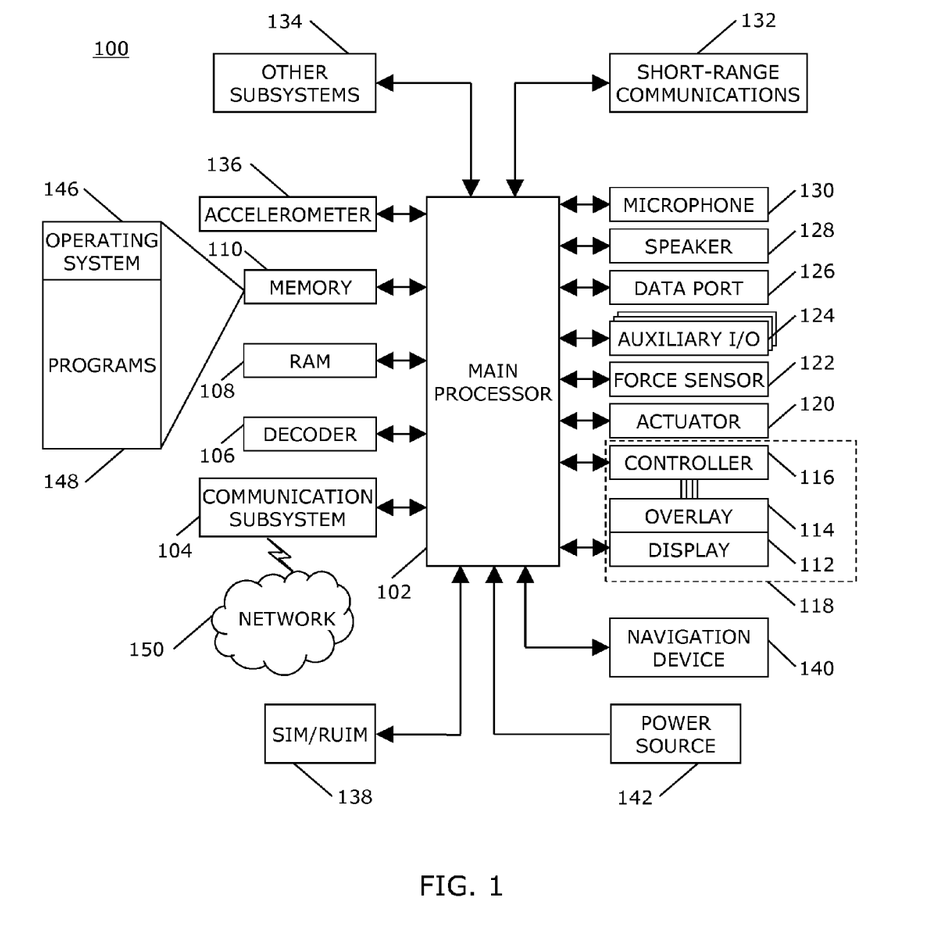
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with one or more optional navigation devices 140, such as one or more touch-sensitive track pads, trackballs, optical joysticks, and so forth, to interface with a user to provide input. The navigation device 140 may be utilized, for example, to navigate through information on a display, control a cursor or other indicator, edit information, select information, and so forth. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

Tactile feedback may optionally be provided. The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Various different types of actuators 120 may be utilized, although only two are described herein. When force is applied, the touch-sensitive display 118 is depressible, pivotable, and/or movable.

Figure 2:
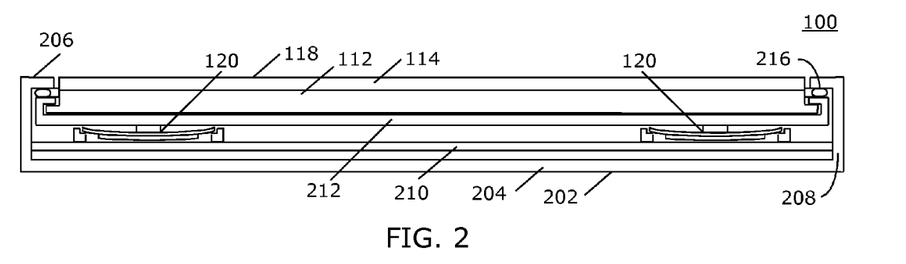
FIG. 2 is a sectional side view of a portable electronic device with piezoelectric actuators in accordance with the disclosure.

A sectional side view of a portable electronic device 100 with piezoelectric ("piezo") actuators 120 is shown in FIG. 2. The cross section is taken through the centers of the actuators 120. The portable electronic device 100 includes a housing 202 that encloses components such as shown in FIG. 1. The housing 202 may include a back 204 and a frame 206 that houses the touch-sensitive display 118. Sidewalls 208 extend between the back 204 and the frame 206. A base 210 extends between the sidewalls 208, generally parallel to the back 204, and supports the actuators 120. The display 112 and the overlay 114 are supported on a support tray 212 of suitable material, such as magnesium. Spacers 216 may be located between the support tray 212 and the frame 206. The spacers 216 may advantageously be flexible and may also be compliant or compressible, and may comprise gel pads, spring elements such as leaf springs, foam, and so forth.

Figure 3:
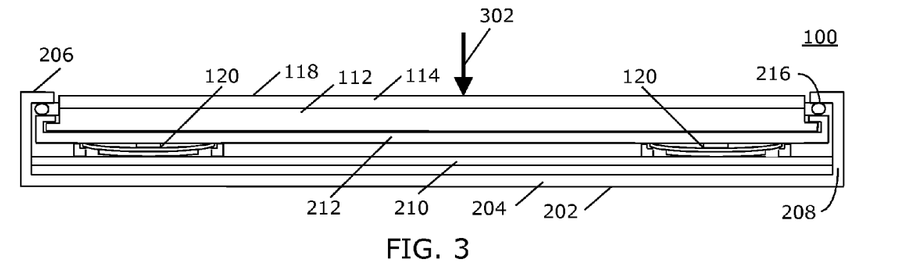
FIG. 3 is a sectional side view of a portable electronic device with a depressed touch-sensitive display in accordance with the disclosure.

The touch-sensitive display 118 is moveable and depressible with respect to the housing 202. A force 302 applied to the touch-sensitive display 118 moves, or depresses, the touch-sensitive display 118 toward the base 210, and when sufficient force is applied, the actuator 120 is depressed or actuated as shown in FIG. 3. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

Figure 4:
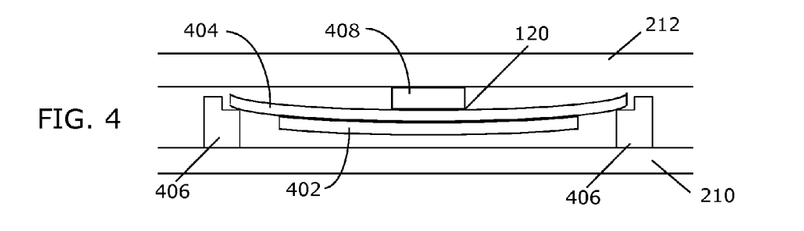
FIG. 4 is a sectional side view of a piezoelectric actuator in accordance with the disclosure.

A sectional side view of a piezo actuator 120 is shown in FIG. 4. The actuator 120 may comprise one or more piezo devices or elements 402. The cross-section of FIG. 4 is taken through the center of one of the piezo actuators 120 utilized in this example. The piezo actuator 120 is shown disposed between the base 210 and the touch-sensitive display 118. The piezo actuator 120 includes a piezoelectric element 402, such as a piezoelectric ceramic disk, fastened to a substrate 404, for example, by adhesive, lamination, laser welding, and/or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications.

The substrate 404, which may also be referred to as a shim, may be comprised of a metal such as nickel or any other suitable material such as, for example, stainless steel, brass, and so forth. The substrate 404 bends when the piezo element 402 contracts diametrically, as a result of build up of charge at the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 120 as shown in FIG. 4. The supports 406 may be disposed on the base 210 or may be part of or integrated with the base 210, which may be a printed circuit board. Optionally, the substrate 404 may rest on the base 210, and each actuator 120 may be disposed, suspended, or preloaded in an opening in the base 210. The actuator 120 is not fastened to the support 406 or the base 210 in these embodiments. The actuator 120 may optionally be fastened to the support 406 through any suitable method, such as adhesive or other bonding methods.

A pad 408 may be disposed between the piezo actuator 120 and the touch-sensitive display 118. The pad 408 in the present example is a compressible element that may provide at least minimal shock-absorbing or buffering protection and may comprise suitable material, such as a hard rubber, silicone, and/or polyester, and/or may comprise other materials such as polycarbonate. The pad 408 may provide a bumper or cushion for the piezo actuator 120 as well as facilitate actuation of the piezo actuator 120 and/or one or more force sensors 122 that may be disposed between the piezo actuators 120 and the touch-sensitive display 118. The pad 408 does not substantially dampen the force applied to or on the touch-sensitive display 118. The pad 408 is advantageously aligned with a force sensor 122. When the touch-sensitive display 118 is depressed, the force sensor 122 generates a force signal that is received and interpreted by the microprocessor 102. The pads 408 facilitate the focus of forces exerted on the touch-sensitive display 118 onto the force sensors 122. The pads 408 transfer forces between the touch-sensitive display 118 and the actuators 120, whether the force sensors 122 are above or below the pads 408. The pads 408 are advantageously flexible and resilient, and facilitate provision of tactile feedback from the actuators 120 to the touch-sensitive display 118.

Figure 5:
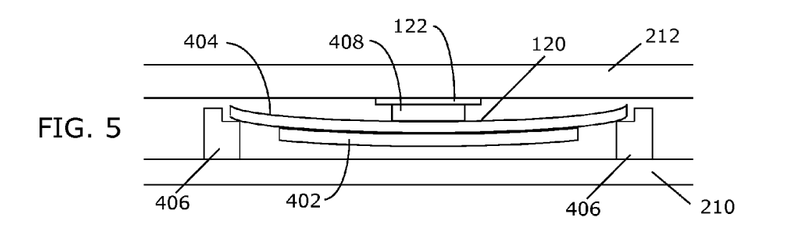
FIG. 5 is a sectional side view of a piezoelectric actuator with a force sensor in accordance with the disclosure.

An optional force sensor 122 may be disposed between the piezo actuator 120 and the touch-sensitive display 118 as shown in FIG. 5. The force sensor 122 may be disposed between the touch-sensitive display 118 and the pad 408 or between the pad and the piezo actuator 120, to name a few examples. The force sensors 122 may be force-sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 402, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. Virtual, also known as soft, keys are displayed. The term "key" or "button" is used interchangeably herein. For example, a lesser force may result in panning, and a higher force may result in zooming.

Portable electronic devices are manufactured in many different form factors, e.g., candybar also referred to as slab or slate or tablet, flip or clamshell, slider, swivel, and so forth. These form factors may take on one or both of landscape and portrait orientations. Portable electronic devices also have varied sizes and shapes. Controls are placed in fixed locations on these devices, which locations may not be comfortable for users in all circumstances. For example, a user with smaller hands, who thumb-types, or who operates a device with one hand may not be able to easily operate navigation controls that are placed in the middle of a larger electronic device in a landscape orientation. Because touch-sensitive displays are flexible in that virtual controls, such as soft keys or buttons, may be displayed at a location, this flexibility is utilized to provide even greater flexibility by providing the user with the ability to select the location for soft controls such as navigation controls, e.g., a navigation button that navigates through information on a display by scrolling or panning, controls a cursor or other indicator, edits information, selects information, and so forth; a menu button that displays various menu options; and a back button that causes the device to go back a page, function, level, process, or other operation. The following describes a method and apparatus for locating one or more controls on a touch-sensitive display 118.

Figure 6:
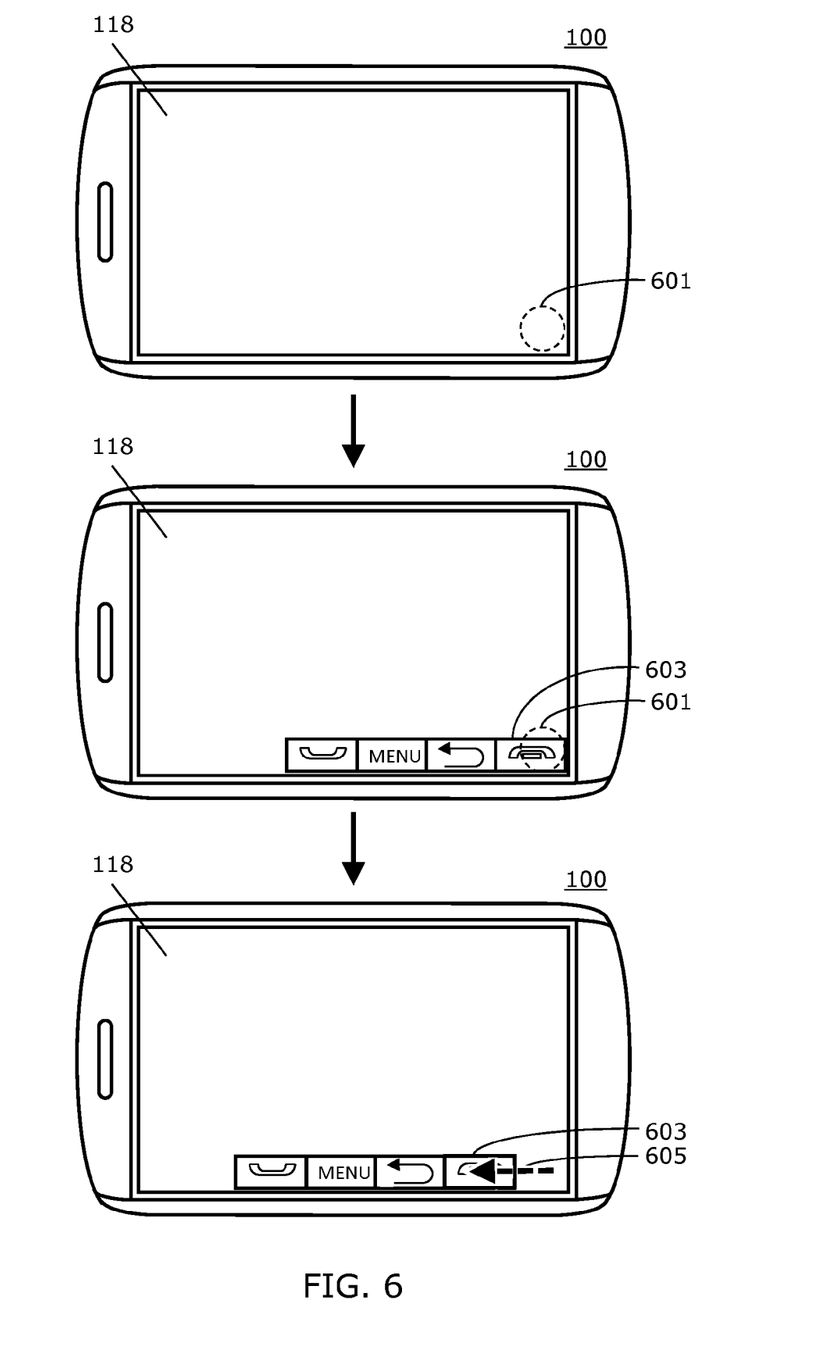
FIG. 6 through FIG. 9 illustrate locating and moving a displayed control on a touch-sensitive display in accordance with the disclosure.

Locating and moving displayed controls on a landscape-oriented touch-sensitive display are shown in FIG. 6. As shown on the upper display 118 of FIG. 6, a touch is detected on the touch-sensitive display 118 at a location 601 not associated with a control when the touch is detected. A location is not associated with a control, for example, when no control is activated for that location, when no control operation is performed when a touch is detected at that location, when no control is displayed for that location when the display is on, and so forth. A control 603 that comprises a control panel in this example is shown displayed in association with the location 601, as shown on the middle display 118 of FIG. 6. The control 603 may optionally be moved to another location input from the user, for example, by a touch. In this example, the control 603 is moved when a touch event, such as a sliding touch or swipe, moves along the display to another location, where the control 603 is redisplayed. The control 603 may optionally move along the display 118 until the touch event ends, e.g., when no touch is detected, as shown by the arrow 605 on the lower display 118 of FIG. 6. The control 603 may be displayed in response to a touch that moves to another location in a single continuous touch or alternatively multiple separate touches, such as a first touch, such as a tap that brings up the control 603, and a second touch, such as a second tap or a swipe or drag to touch location where the control is located. The control 603 that is a navigation control panel in this example is activated, and further touches associated with any location associated with the control are processed in accordance with the control associated with the touch location(s). The original location 601 may be anywhere on the touch-sensitive display 118, and the final location of the control 603 may be moved to any location on the touch-sensitive display 118, such as on the left or right side, top or bottom, along an edge, and so forth.

Figure 7:
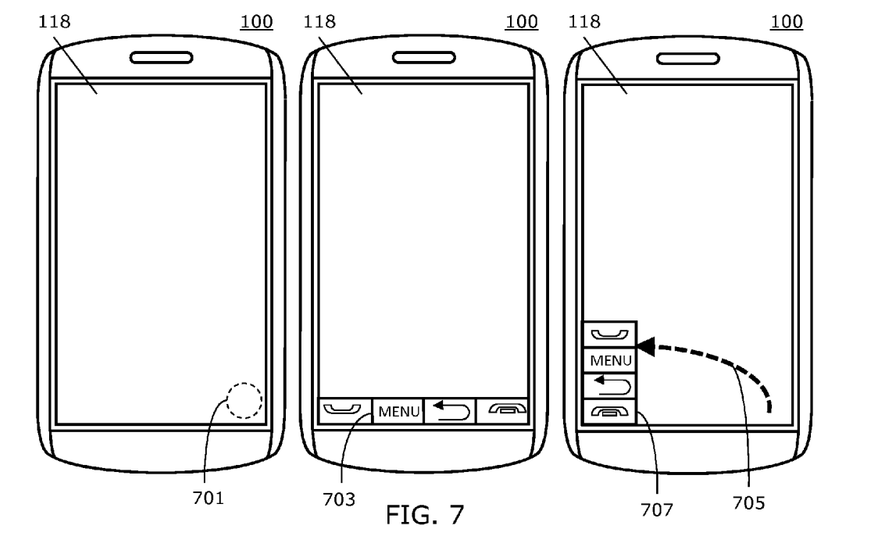
Figure 8:
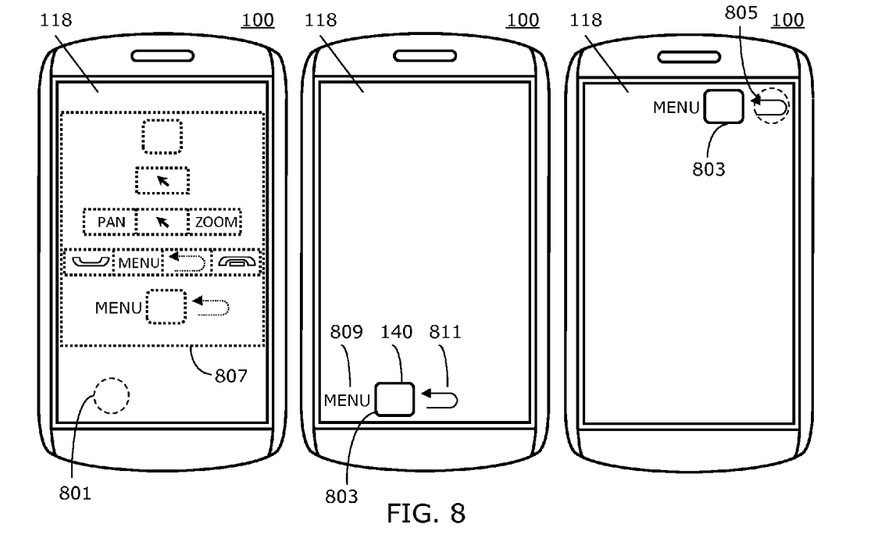

Locating and moving displayed controls on a portrait-oriented touch-sensitive display is shown in FIG. 7 and FIG. 8. As shown on the left display 118 of FIG. 7, a touch is detected on the touch-sensitive display 118 at a location 701 not associated with a control when the touch is detected. A control 703 that comprises a control panel in this example is shown displayed in association with the location 701 as shown on the middle display 118 of FIG. 7. The control 703 may optionally be oriented differently via input from the user, for example, by a touch. The control 703 is moved when a touch event, such as a curved sliding touch or swipe, moves along the display to another location, where the control 705 is displayed in a new orientation, as shown on the right display 118 of FIG. 7. The control 703, 705 may optionally be moved to another location before or after orientation change. The control 703 that is a navigation control panel in this example is activated, and further touches associated with any location associated with the control are processed in accordance with the control associated with the touch location(s). The original location 701 may be anywhere on the touch-sensitive display 118, and the final location of the control 703, 705 may be at any location on the touch-sensitive display 118, such as on the left or right side, top or bottom, along an edge, and so forth.

As shown on the left display 118 of FIG. 8, a touch is detected on the touch-sensitive display 118 at a location 801 not associated with a control when the touch is detected. For example, the device 100 may verify that no control is associated with the location 801 in a map of locations and controls for the current information being displayed. Optionally, one or more control options, such as one or more single controls and/or one or more control panels, may be displayed for selection as the control, as shown in the left display of FIG. 8. The control options 807 may be displayed before or after detection of the touch that initiates the control selection process. The control options 807 may be displayed in alternate format, such as dotted form, to initiate the control selection process, such as at 1202 in FIG. 12, or to further the process, such as at 1206 in FIG. 12. In this example, the lowermost control panel of the options 807 is selected as the control. The selected control 803 comprises a control panel in this example and is shown displayed in association with the location 801, as shown on the middle display 118 of FIG. 8. The control 803 may optionally be moved to another location input from the user, for example, by a touch. In this example, the control 803 is moved in response to a touch event, such a tap or double-tap, at another location 805 where the control 803 is redisplayed, as shown on the right display 118 of FIG. 8. The control 803 is a navigation control panel comprising a navigation control 140, menu button 809, and back button 811 in this example. The control 803 is activated, and further touches associated with any location associated with the control are processed in accordance with the control 140, 809, 811 associated with the touch location(s), e.g., menu, navigation, or back, respectively. The original location 801 may be anywhere on the touch-sensitive display 118, and the final location of the control 803 may be moved to any location on the touch-sensitive display 118, such as on the left or right side, top or bottom, along an edge, and so forth.

Figure 9:
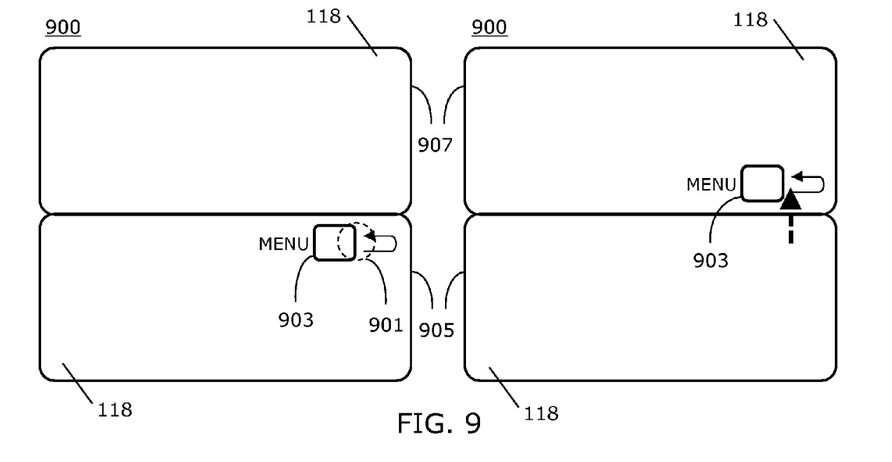

Locating and moving displayed controls on a landscape-oriented touch-sensitive display of a portable electronic device 100 comprising a flip or clamshell device 900 is shown in FIG. 9. In the example of FIG. 9, the flip device 900 comprises two segments or sections that fold via a hinge and are physically separated. Each segment contains at least one touch-sensitive display area, which combined areas comprise the touch-sensitive display 118. As shown on the left device 900 of FIG. 9, a touch is detected on the lower segment 905 touch-sensitive display 118 at a location 901 not associated with a control when the touch is detected, and a control 903 that comprises a control panel in this example is shown displayed in association with the location 901. The control 903 may optionally be moved to another location input from the user, for example, by a touch. In this example, the control 903 is moved in response to detecting a touch event, such as a sliding touch or swipe illustrated by the arrow, which touch event moves along the display 118 to another location, where the control 903 is redisplayed. The control 903 may optionally move along the display 118 until the touch event ends, e.g., when no touch is detected, as shown on the right display 118 of FIG. 9. In this example, the touch event moves from the lower segment 905 to the upper segment 907 of the device 900. Optionally, a tap or double tap on the upper segment may be utilized to move the control 903. The control 903 is a navigation control panel comprising a navigation control, menu button, and back button in this example. The control 903 is activated, and further touches associated with any location associated with the control are processed in accordance with the control 903 associated with the touch location(s), e.g., menu, navigation, or back. The original location 901 may be anywhere on the touch-sensitive display 118, and the final location of the control 903 may be moved to any location on the touch-sensitive display 118, such as on the left or right side, top or bottom, along an edge, on either segment, and so forth. The control 903 may optionally be located and activated on a touch-sensitive display on an outer surface of the flip device 900, for example, when the flip device 900 is folded or closed.

Figure 10:
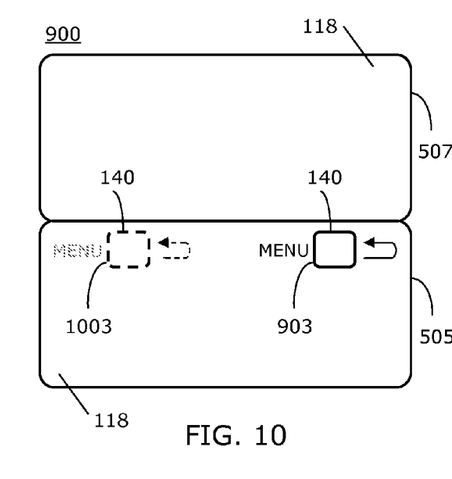
FIG. 10 and FIG. 11 illustrate dual displayed controls in accordance with the disclosure.

Dual displayed controls are illustrated in FIG. 10. More than one control or control panel may be displayed, for example, on electronic devices 100 with larger form factors, such as a landscape flip or a tablet. A control 903 is displayed in association with a first location at which a touch is detected on the touch-sensitive display 118. In this example, the control 903 is a navigation control panel comprising a navigation control 140, menu button, and back button displayed on the right side of a lower segment 505 of a flip device 900. The control 903 is the first control activated, i.e., no similar control was active at the time the control is activated, and becomes the primary or dominant control.

Another control 1003 is displayed in association with a second location at which a touch is detected on the touch-sensitive display 118. In this example, the control 1003 is also a navigation control panel comprising a navigation control 140, menu button, and back button displayed on the left side of the lower segment 505 of a flip device 900. This control 1003 is the second control activated, i.e., a similar control was active at the time the control 1003 is activated, and becomes the secondary, subservient, or special control.

Functions are associated with each control 903, 1003 upon activation, and subsequent touches associated with any location associated with the control 903, 1003 are processed in accordance with the function associated with the touch location(s). The user may switch or change which control 903, 1003 acts as the dominant control and which control 903, 1003 acts as the secondary control. The switch or change may be input through a menu or special gesture that is recognized as switching the dominant/secondary control assignment.

The primary control 903 and secondary control 1003 may both be associated with common functions, and when a conflict arises with the simultaneous use of these controls 903, 1003, the primary control 903 rules, and the secondary control 1003 is ignored as long as the conflict exists. For example, the menu button or back button may be driven by either control 903, 1003. In another example, selection of a feature may be made by a tap on either navigation device 140.

Advantageously, the primary control 903 may be associated with one set of functions, while the secondary control 1003 is associated with a different set of functions. A set of functions comprises one or more functions. Functions may vary based on the application or information being displayed. Functions in the two sets may be paired. The controls 903, 1003 may advantageously work together and have a complementary relationship depending on the application, information displayed, functions, and so forth. The following are a number of examples of pairs of functions. One navigation control 140 may pan or scroll an image or webpage, while the other navigation control 140 zooms in or out on the image or webpage. One navigation control 140 may provide navigation control, such as moving, e.g., panning or scrolling through displayed information, while the other navigation control 140 is a cursor control that moves a cursor, highlighter or other indicator through the displayed information, and may also bring up and remove the cursor. One navigation control 140 may pan or scroll through webpage, while the other navigation control 140 moves the information in a window or field displayed on the webpage, such as a map moving in a window on a webpage. One navigation control 140 may be a fine cursor control, e.g., less movement along the display compared to the movement along the control, and the other navigation control 140 may be a course cursor control, e.g., more movement along the display compared to the movement along the control. Different gaming controls may be assigned to each control 903, 1003, such as moving up or down with one control 140 and left or right with the other, weapons and shields, different objects or characters, and other game controls.

A combination of touches on the controls 903, 1003 may provide an optional third set of functions. For example, holding one navigation control 140 while a moving touch along the other navigation control 140 may result in highlighting information, deleting information, various gaming functions, and so forth. In a map, browser, or other application, cursor control, panning control, zoom control may be provided by touches on the individual and combination of controls, and so forth.

Figure 11:
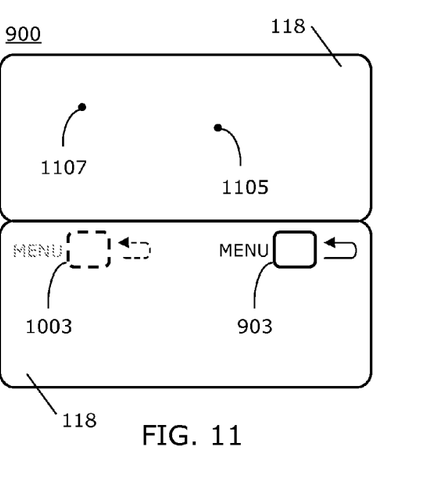

Each control may control a respective endpoint in the displayed information. For example, the primary control 903 may control one end point 1105 and the secondary control 1003 may control a second end point 1107 associated with information displayed on the touch sensitive display 118, such as shown in FIG. 11. The end points may comprise, for example, the beginning and end points for selecting text for editing functions, corners that identify an area for zooming or cropping, e.g., for an image or webpage, the beginning and end times for a meeting or event, and so forth.

The first and second locations may be fixed or unmoving locations on the touch-sensitive display 118. Prior to activation, an alternate image, such as a ghosted, outlined, dashed, darkened, shaded, or other alternate format in the shape of the control, may be displayed to identify the location and size of the controls 903, 1003 for easy identification. Alternatively, one or both of the controls 903, 1003 may be moved to different locations. The first and/or second locations may not have been associated with any displayed control at the time of the activation of the controls 903, 1003.

The secondary control 1003 may be displayed in a format that is different than the format utilized to display the primary control 903. For example, different colors, highlighting, shadowing, ghosting, and other format characteristics may be distinguished between the two controls 903, 1003. For example, the primary control 903 may be displayed in full color, while the secondary control may be display in black and white or other alternative colors, in outline or embossed form, with significantly less brightness, and so forth.

The navigation controls 140 described in the examples above are virtual controls displayed on the touch-sensitive display 118. Optionally, on or more of the navigation devices 140 may be a physical device, such as a track pad, a trackball, and an optical joystick, rather than a virtual control displayed on the touch-sensitive display 118. The physical device may be dormant until activated, e.g., by detection of a tap, double tap, or other gesture or touch on the device 140. Optionally, one or more other controls, such as a menu button, back button, call answer button, call disconnect button, and so forth, may be displayed next to or near one or more physical devices 140 when activated. The first navigation control 140 activated becomes the dominant control, and if a second navigation control 140 is activated, it becomes the secondary control, as described above.

Figure 12:
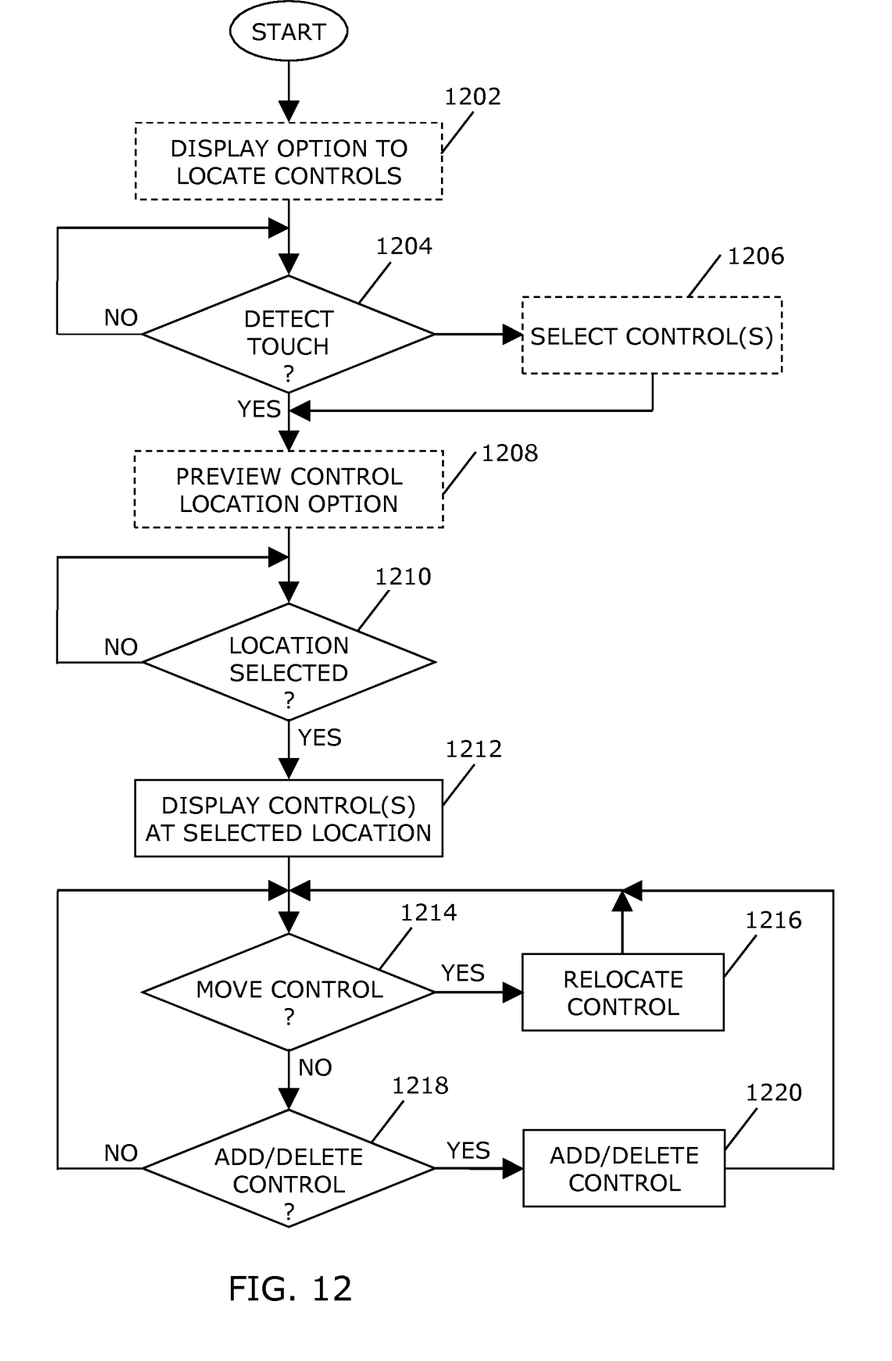
FIG. 12 is a flowchart illustrating a method of locating a control on a touch-sensitive display in accordance with the disclosure.

A flowchart illustrating a method of locating a control on a touch-sensitive display of an electronic device is shown in FIG. 12. The control may be a single control or a control panel, such as described above. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device 100 to perform the method may be stored in a computer-readable medium.

An option to locate one or more controls is optionally displayed 1202 on the touch-sensitive display 118. The option may be displayed for a fixed time period, until a control is located, until cancelled by user input, and so forth. Locations for one or more controls may optionally be displayed at 1202, for example, as a simple shape, e.g., a circle, rectangle, and so forth, or as a more complex shape, such as an outline, ghosted, dashed or dotted, darkened, highlighted, blinking, or other alternatively formatted version of the control identifier(s) that is displayed when the control is active. The controls to be located may be prompted by the device 100 or entered or selected by the user, e.g., through a menu, option box, display of a list, such as shown in FIG. 8, and so forth.

When a touch is detected at a possible location for a control at 1204, one or more controls may optionally be selected 1206. For example one or more controls, such as a single control, multiple controls, a control panel, and/or multiple control panels may be selected from a list, menu, or display of multiple controls and/or control panels. One example is shown in FIG. 8. The control location may be optionally previewed at 1208. The preview may comprise a display of the control as it looks when activated, but with a variation to indicate that the control is not yet activated. The variation may be an added question mark displayed on the control, alternate format such as outline, ghosted, dashed or dotted, darkened, highlighted, blinking, and so forth, or other visual, audible, or tactile method of indication. Such a preview may be beneficial when the user selects a location near an edge of the touch-sensitive display 118 or when the display may not be located in the specific location input by the user. The control locations may alternatively be limited, such as in three or four locations. These location options may be identified at 1202 or 1208, and may be displayed, for example, as described above with respect to a preview of the controls.

The location is selected at 1210, for example, by a touch event or gesture associated with the location, such as a tap, double tap, swipe, depression of a moveable touch-sensitive display 118 that meets a threshold, by selecting a menu item or displayed option, by activating a physical control such as a key, trackpad, or optical joystick. Tactile feedback may optionally be provided when the location is selected, such as described above.

The location may not be associated with a control at the time the location is selected. The device 100 may determine whether a control is associated with the location by looking up the location in a map of locations and active controls for the current information being displayed. One or more maps may be maintained for each application or the operating system of the device 100. Assigning a control to a location when the location is not already associated with an active control may be advantageous, because that active control need not be moved, reassigned, or otherwise processed. The processor 102 may optionally prevent or adjust control locations based on space constraints or locations of other controls or information. When a control is associated with a selected location, the device may temporarily display the new control at another location, prompt the user with a message identifying the active control located at the selected language and request confirmation, prompt the user for a new location for either the active control or the new control, and so forth.

The control, which may be a control panel such as shown in FIG. 6 through 10, is displayed at the selected location 1212, and the displayed control is activated, for example, by adding the control to the map associating locations and active controls. The functions associated with the control are thus associated with the locations. Detection of a subsequent touch associated with a location that is associated with the displayed control results in performance of a function that is associated with that displayed control.

Once a control is displayed at the selected location, the control may optionally be moved 1214. For example, the control may be moved for a short time after its initial display, upon a prompt from the device, through menu selection, holding down a physical control such as <shift>, <alt>, <symbol>, or <ctrl> while touching the control, and so forth. A control may be moved by a drag-and-drop or select-and-move operation, such as touching a location associated with the control and sliding along the display until the desired location or subsequently touching the desired location with a non-sliding touch such as a tap or double tap. The displayed control may move along with the touch to give better guidance for location. The new location is selected, for example, by a touch event or gesture associated with the location, such as a tap, double tap, swipe, depression of a moveable touch-sensitive display 118 that meets a threshold, by selecting a menu item or displayed option, by activating a physical control such as a key, trackpad, or optical joystick. Tactile feedback may optionally be provided when the location is selected, such as described above. The control is relocated at the new location 1216, and any maps or other information associating the control with functions and locations are updated with the new location. Controls may be moved any number of times. Control locations may be stored in a user profile and may be identified as default locations when the device powers up. Although any location may be provided for a control, the processor 102 may optionally prevent or adjust control locations based on space constraints or locations of other controls or information.

Additional controls may optionally be added and active controls may be deactivated or deleted 1218. The process of adding 1220 a new control is similar to the process of locating the initial control, e.g., in response to a displayed option, entering an application, selection through a menu, by detecting a touch associated with a predetermined location, and so forth. The second control may provide the same or different functions as the initial control, and the pair of controls may operate such as described above with respect to FIG. 10 and FIG. 11. The user may associate functions with each control by checking boxes in a list or other entry process. Deactivating or deleting 1220 a control may simply involve selecting an option from a menu and touching the control to deactivate or delete. A prompt to confirm deletion may be provided. Any functions associated with a deactivated control and its associated locations are deleted from the map or other associative process.

A control may optionally be displayed in a reduced format, e.g., ghosted, outlined, dashed or dotted, darkened, blinking, and so forth, when the control has not be used for predetermined period of time, after power down of the touch-sensitive display, or when the control is not needed based on the current conditions of the electronic device 100. Information that is displayed subsequent to location of a control takes into account the location of the displayed control to prevent undesired overlap or elimination of information within the area of the displayed control. Controls may be located as described above on an electronic device with any form factor, although the examples described above are provided with particular form factors.

Controls are located with input provided by a user, facilitating more flexible location of controls based on a user's preferences and operation conditions. One-handed users, thumb-typers, users with small hands, and anyone who prefers to locate controls more conveniently to their situation are thus provided with variable and adaptable capabilities of locating controls. Multiple controls provide additional user interface options that are not provided or easily operated on existing devices. Controls may be located to minimize effect on the displayed information.

An electronic device comprises a touch-sensitive display, a first touch-sensitive device disposed within the touch-sensitive display, a second touch-sensitive device disposed within the touch-sensitive display, and a processor configured to: when a touch is detected on the first touch-sensitive device when the first touch-sensitive device and the second touch-sensitive device are not active, activate the first touch-sensitive device as a dominant control and display a first control near the first touch-sensitive device; when a touch is detected on the second touch-sensitive device when the first touch-sensitive device and the second touch-sensitive device are not active, activate the second touch-sensitive device as a dominant control and display a second control near the first touch-sensitive device; when a touch is detected on the first touch-sensitive device when the second touch-sensitive device is the dominant control, activate the first touch-sensitive device as a secondary control and display a third control near the first touch-sensitive device. The first touch-sensitive device may be one of a touch-sensitive track pad, a trackball, and an optical joystick. At least one of the first touch-sensitive device and the second touch-sensitive device may be a virtual control displayed on the touch-sensitive display. At least one of the first control, the second control, and the third control may be a menu control. A method comprises detecting a first touch at a first location on a touch-sensitive display; displaying, in association with the first location, a first control and activating the first control; detecting a second touch at a second location on the touch-sensitive display; and displaying, in association with the second location, a second control and activating the second control.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting a touch on a touch-sensitive display at a first location not associated with a control;
   detecting selection of a control from a plurality of control options as a first selected control;
   displaying, in association with the first location, the first selected control as a first displayed control and activating a first set of functions for the first displayed control;
   detecting a touch on a touch-sensitive display at a second location not associated with a control;
   detecting selection of a control from the plurality of control options as a second selected control;
   displaying, in association with the second location, the second selected control as a second displayed control and activating a second set of functions for the second displayed control, wherein display of the first control overlaps in time with display of the second control, wherein a subset of the first set of functions is the same as a subset of the second set of functions, wherein the first set of functions comprises a function different from any of the second set of functions.

2. The method of claim 1, wherein activating the displayed control comprises associating the location with at least one function associated with the displayed control.

3. The method of claim 1, further comprising performing a function associated with the displayed control when a subsequent touch associated with the displayed control is detected.

4. The method of claim 1, further comprising changing an orientation of the displayed control.

5. The method of claim 1, wherein the control is a control panel.

6. The method of claim 1, further comprising displaying an option to locate the displayed control.

7. The method of claim 1, further comprising displaying a control in an alternate format prior to detecting the touch.

8. The method of claim 1, further comprising moving the displayed control to another location.

9. The method of claim 1, further comprising moving the displayed control to a second location, wherein the first location is located on a first segment of the touch-sensitive display and the second location is located on a second segment of the touch-sensitive display, wherein the first segment and the second segment are physically separated.

10. The method of claim 1, wherein the displayed control is displayed in a reduced format when the control is not used for a predetermined period of time or after power down of the touch-sensitive display.

11. The method of claim 1, wherein the plurality of control options includes at least one control panel.

12. The method of claim 1, further comprising displaying a second control in response to detecting a second touch.

13. The method of claim 12, wherein a first function of the first set of functions for the displayed control has a complementary relationship with a second function of the a second set of functions for the second control.

14. A computer-readable storage device having computer-readable code executable by at least one processor of the portable electronic device to perform the method of claim 1.

15. An electronic device configured to perform the method of claim 1.

16. A method comprising:
 detecting a first touch at a first location on a touch-sensitive display;
 in response to detecting the first touch, displaying, in association with the first location, a first control and activating a first set of functions for the first control;
 detecting a second touch at a second location on the touch-sensitive display;
 in response to detecting the second touch, displaying, in association with the second location, a second control and activating a second set of functions for the second control, wherein a subset of the first set of functions is common with a subset of the second set of functions;
 wherein a third set of controls is associated with a combination of touches associated with the first control and the second control;
 wherein display of the first control overlaps in time with display of the second control.

17. The method of claim 16, wherein the first location and the second location are in fixed locations on the touch-sensitive display.

18. The method of claim 16, wherein the first location is not associated with any displayed control when the first touch is detected.

19. The method of claim 16, wherein the second location is not associated with any displayed control when the second touch is detected.

20. The method of claim 16, wherein a first function of the first set of functions for the first control has a complementary relationship with a second function of the second set of functions for the second control.

21. The method of claim 16, further comprising detecting a third touch associated with the first control and a fourth touch associated with the second control and performing a function based on the third touch and the fourth touch.

22. The method of claim 21, wherein the first control is a navigation control and the second control is a cursor control.

23. The method of claim 21, wherein the first control controls a first end point and the second control controls a second end point associated with information displayed on the touch-sensitive display.

24. The method of claim 16, wherein the first control is dominant and the second control is secondary.

25. The method of claim 24, further comprising switching between the first control and the second control as dominant control.

26. The method of claim 24, wherein the dominant control displayed in a first format and the secondary control displayed in second format that is different than the first format.

27. The method of claim 16, further comprising moving at least one of the first control and the second control to a third location.

28. The method of claim 16, further comprising selecting the first control from a plurality of control options.

29. A computer-readable medium having computer-readable code executable by at least one processor of the portable electronic device to perform the method of claim 16.

30. An electronic device comprising:
 a touch-sensitive display;
 a processor configured to:
  when a touch is detected at a first location on the touch-sensitive display when a control is not active at the first location, display and activate a first control as a dominant control, wherein the first control is associated with a first set of functions;
  when a touch is detected at a second location on the touch-sensitive display when a control is not active at the second location, display and activate a second control as a secondary control to the dominant control, wherein the second control is associated with a second set of functions, wherein a first subset of the first set of functions is common with a first subset of the second set of functions, wherein a second subset of the first set of functions is different from a second subset of the second set of functions, and wherein display of the first control overlaps in time with display of the second control.

31. The electronic device of claim 30, further comprising a first touch-sensitive device that is one of a touch-sensitive track pad, a trackball, and an optical joystick.

32. The electronic device of claim 30, further comprising a second touch-sensitive display.

33. The electronic device of claim 30, wherein the first control controls a first end point for selecting text, and the second control controls a second end point for selecting text displayed on the touch sensitive display.

* * * * *